S. W. BALDWIN & C. A. PENEY.
AUTOMOBILE CONTROL LOCK.
APPLICATION FILED JAN. 31, 1917.
1,223,236.
Patented Apr. 17, 1917.
2 SHEETS—SHEET 2.
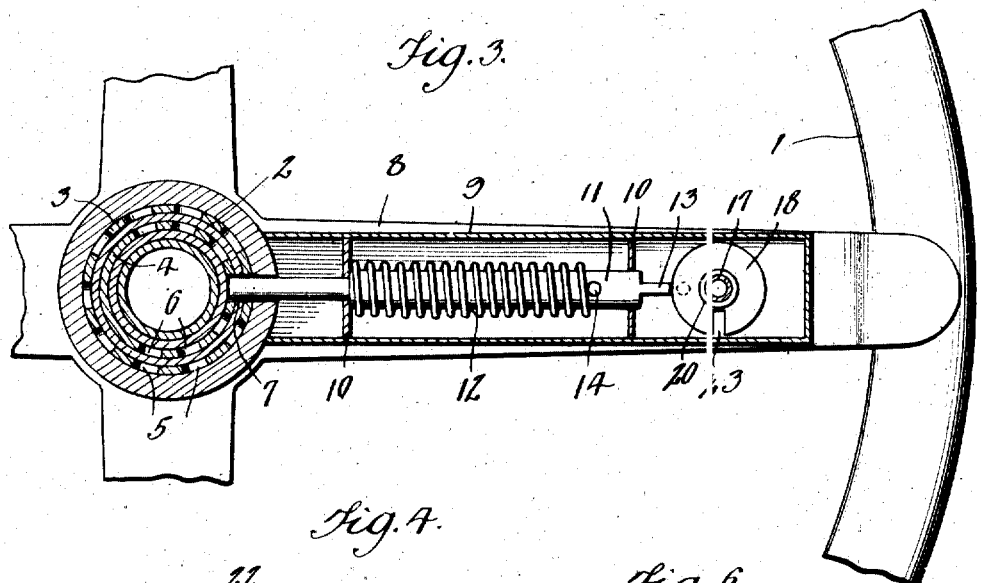
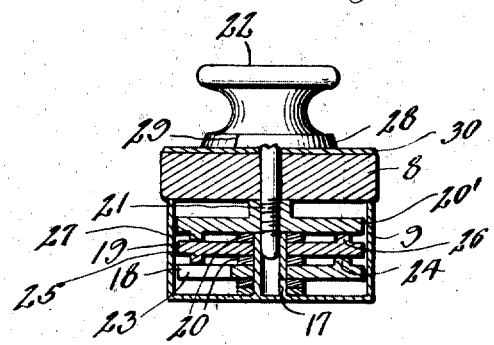
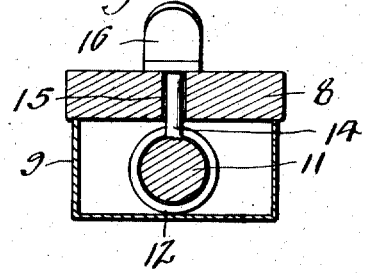
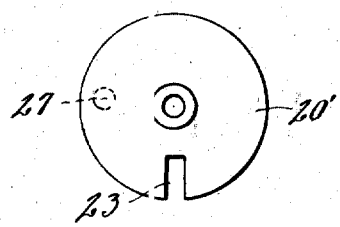
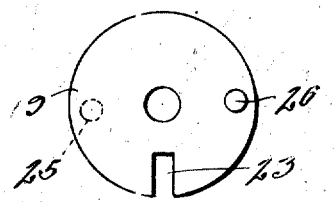
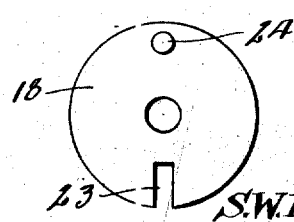
WITNESSES
INVENTORS
S. W. Baldwin,
C. A. Peney,
BY Victor J. Evans
ATTORNEY

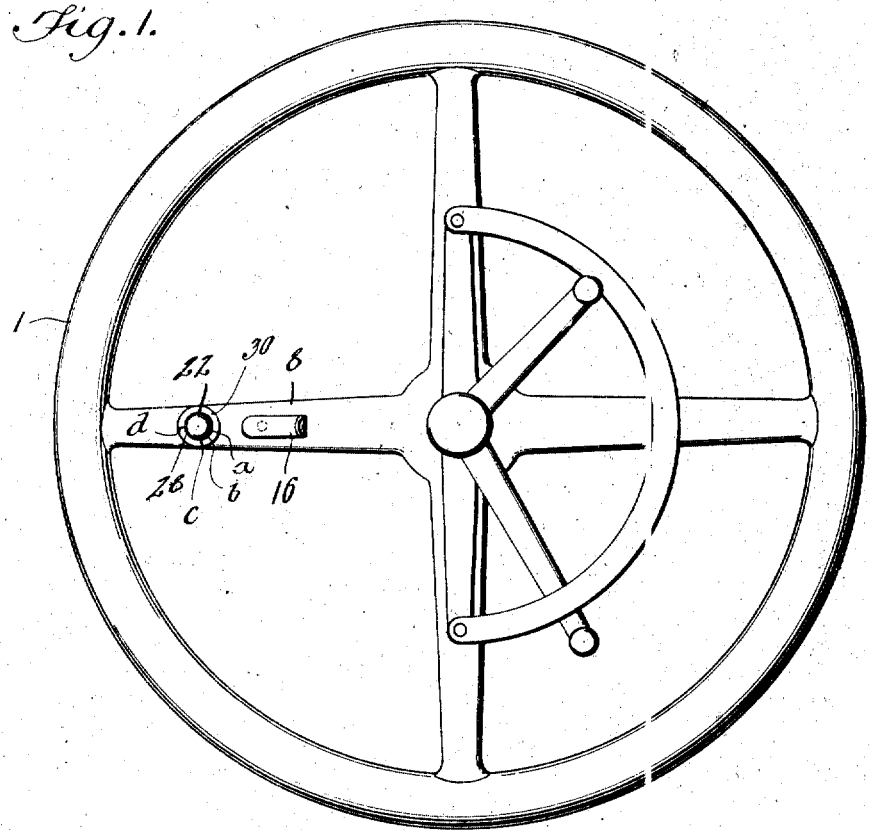
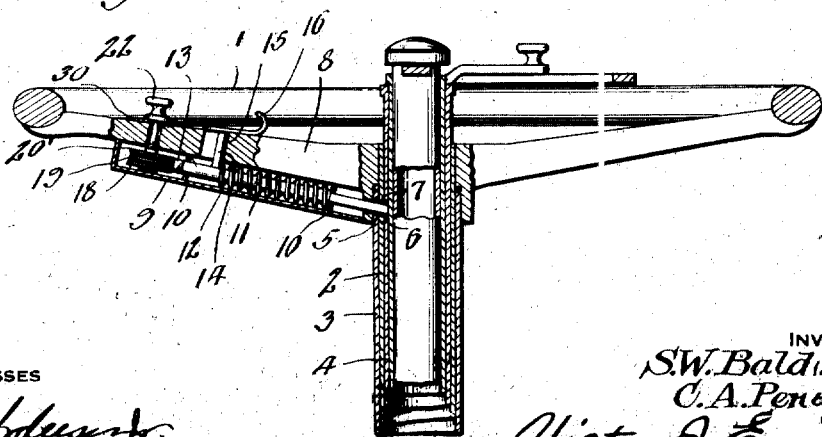

UNITED STATES PATENT OFFICE.

SAMUEL W. BALDWIN AND CHARLES A. PENEY, OF HAMMOND, LOUISIANA.

AUTOMOBILE-CONTROL LOCK.

1,223,236.    Specification of Letters Patent.    Patented Apr. 17, 1917.

Application filed January 31, 1917. Serial No. 145,736.

*To all whom it may concern:*

Be it known that we, SAMUEL W. BALDWIN and CHARLES A. PENEY, citizens of the United States, residing at Hammond, in the parish of Tangipahoa and State of Louisiana, have invented new and useful Improvements in Automobile-Control Locks, of which the following is a specification.

This invention relates to automobile control locks, the object in view being to provide simple, reliable and compact means for enabling the owner or operator of an automobile or other vehicle to lock the steering wheel; also to lock a controlling member of the throttle; also to simultaneously lock the steering wheel and throttle member; also to lock the steering wheel at any desired point in the turning movement thereof; also to lock the throttle lever at any desired point in the throw thereof.

A further object in view is to provide simple and effective means of a permutation type for controlling the locking bolt, for holding the latter in locking engagement and for releasing the latter and allowing the same to move away from its locking position.

With the above and other objects in view, the invention consists in the novel construction, combination and arrangement of parts, herein described, illustrated and claimed.

In the accompanying drawings:

Figure 1 is a plan view of the hand steering wheel of a motor vehicle, showing the locking mechanism applied thereto.

Fig. 2 is a section taken diametrically of the hand controlling wheel and extending diametrically through the stationary casing of the steering column, the tubular steering shaft, and the throttle operating shaft, showing the bolt in locking position.

Fig. 3 is a transverse section through the hub of the hand controlled wheel and the tubular members associated therewith.

Fig. 4 is a fragmentary section taken in line with the shank of the operating knob.

Fig. 5 is a fragmentary section taken in line with the bolt operating pin.

Fig. 6 is a detail plan view of the several tumbler disks.

Referring to the drawings 1 designates the ordinary hand controlled wheel such as is now commonly used in automobile practice. The wheel 1 is fast upon the upper end of a tubular steering shaft 2 and the latter is rotatably mounted in a stationary or non-rotary tubular casing 3 while a rotatable throttle controlling shaft 4 is mounted within the tubular shaft 2, the member 4 being also preferably tubular, and all of said parts being of the usual construction and relative arrangement.

In carrying out the present invention, the stationary casing 3 is provided adjacent to its upper extremity with a circular series of bolt receiving holes 5 and the member 4 is also provided adjacent to the upper extremity thereof with a circular series of bolt receiving holes 6, while the steering shaft 2 is provided with a single bolt receiving hole 7, the holes 5 and 6 being arranged so that they may be brought into line with the hole 7 in order that the bolt of the locking mechanism hereinafter described may project through all three of the tubular members 2, 3 and 4 in order to lock the rotatable tubular members temporarily in fixed relation to the stationary or non-rotary casing 3.

On the under side of one of the spokes 8 of the hand controlling wheel 1 there is a lock casing 9 containing guides 10 for a sliding bolt 11 which is yieldingly held away from the hub of the wheel 1 by means of a coiled expansion spring 12. The bolt 11 is provided at one end with a bit or projection 13, which coöperates with the tumblers hereinafter referred to and said bolt also has attached thereto a pin 14 which works through a slot 15 in the adjacent spoke 8 of the controlling wheel and has at the outer extremity thereof a thumb piece 16 by means of which the bolt may be slid into locking position.

Extending from one wall of the lock casing 9 is a tubular post 17 and surrounding said post are rotatable disks or tumblers 18 and 19, suitable washers 20 being interposed between said disks and between the bottom tumbler 18 and the adjacent wall of the casing. Another similar disk 20' is superimposed upon the disk or tumbler 19 and it is internally threaded to receive the threaded shank 21 of an operating knob 22, the shank 21 being screwed tightly into the upper disk 20' so that the last named disk is caused to rotate with the knob, as a part thereof. Each of the disks or tumblers is formed with a peripheral notch 23. The bottom disk 18 has an upwardly projecting stud or stop 24. The disk or tumbler 19 has a downwardly extending stud 25 and an upwardly projecting stud 26. The upper disk has a downwardly projecting stud 27. The knob 22 is formed with a base flange 28 having a mark or graduation 29 thereon which is adapted to register with graduations $a$, $b$, $c$ and $d$, on a fixed dial or indicator plate 30 which is fastened to the upper face of the spoke 8 within plain view of the operator while in his seat.

From the foregoing description taken in connection with the accompanying drawings, the operation of the locking mechanism will now be understood. Under driving conditions, the disks 18, 19 and 20 are set with the notches 23 thereof in position to receive the bit or projection 13 of the locking bolt 11 and said projection or bit is held in said notches of the disks by means of the spring 12. To lock the machine, the hand controlling wheel is turned to any desired position either with the steering wheels facing straight forward or arranged at any suitable angle, and the hand throttle lever 31 is preferably turned to throttle closing position until one of the holes 6 therein is brought into line with the hole 7 in the steering shaft and both of such holes are in line with one of the holes 5 in the non-rotary casing. By means of the thumb-piece 16, the bolt is then moved into its locking position, passing through the holes 5, 6 and 7. The knob 22 is then turned so as to disarrange the combination by shifting the disks 18 and 19 and 20. To unlock the controls of the automobile, the knob 22 is manipulated in connection with the dial 30 so as to cause the studs 24, 25, 26 and 28 to properly coöperate until the notches 23 are again brought into line with each other and in position to receive the projection or bit 13 of the locking bolt. As soon as this takes place, the spring 12 shifts the bolt to its unlocking position.

As shown in the drawings the device as a whole is exceedingly compact and there is practically nothing visible except the operating knob 22, the dial 30 and the thumb-piece 16, making the device very desirable as compared with the unsightly locking devices now in use.

We claim:—

1. Automobile control locking means comprising, in combination, a hand controlling wheel, a tubular shaft on which said wheel is fastened formed with a bolt hole in one side thereof, a non-rotatable casing surrounding said shaft and also having a bolt hole adapted to register with the first named bolt hole, a lock casing carried by said wheel, a locking bolt slidable therein and movable into engagement with said bolt holes, a thrust spring for moving said bolt out of locking position, manually controlled means for shifting said bolt into locking position, and keyless locking mechanism for holding and releasing said bolt.

2. Automobile control locking means comprising, in combination, a hand controlling wheel, a tubular shaft on which said wheel is fastened formed with a bolt hole in one side thereof, a non-rotatable casing surrounding said shaft and also having a bolt hole adapted to register with the first named bolt hole, a rotatable throttle shaft housed within said steering shaft and also formed with a bolt hole, a lock casing carried by said wheel, a locking bolt slidable therein and movable into engagement with said bolt holes, a thrust spring for moving said bolt out of locking position, manually controlled means for shifting said bolt into locking position, and keyless locking mechanism for holding and releasing said bolt.

3. Automobile control locking means comprising, in combination, a hand controlling wheel, a tubular shaft on which said wheel is fastened formed with a bolt hole in one side thereof, a non-rotatable casing surrounding said shaft and formed with a series of bolt holes extending circumferentially thereof, a lock case carried by said hand controlling wheel, a locking bolt mounted in said lock case and adapted to enter the bolt holes in said tubular members, yieldable means for holding said bolt in unlocking position, manually controlled means for shifting said bolt into locking position, and keyless bolt holding and releasing means.

4. Automobile control locking means comprising, in combination, a hand controlling wheel, a tubular shaft on which said wheel is fastened formed with a bolt hole in one side thereof, a non-rotatable casing surrounding said shaft and formed with a series of bolt holes extending circumferentially thereof, a tubular throttle control shaft housed within said steering shaft and formed with a bolt hole, a lock case carried by said hand controlling wheel, a locking bolt mounted in said lock case and adapted to enter the bolt holes in said tubular members, yieldable means for holding said bolt in unlocking position, manually controlled means for shifting said bolt into locking position, and keyless bolt holding and releasing means.

In testimony whereof we affix our signatures.

SAM W. BALDWIN.
CHARLES A. PENEY.